OFF-LINE MEMORY TEST

Filed Aug. 13, 1965 5 Sheets-Sheet 1

INVENTOR
RICHARD C. REICHOW

BY Griffin and Branigan
ATTORNEYS

OFF-LINE MEMORY TEST

Filed Aug. 13, 1965

June 4, 1968 R. C. REICHOW 3,387,276

OFF-LINE MEMORY TEST

Filed Aug. 13, 1965 5 Sheets-Sheet 5

United States Patent Office 3,387,276

Patented June 4, 1968

3,387,276

OFF-LINE MEMORY TEST

Richard Charles Reichow, St. Paul, Minn., assignor to Sperry Rand Corporation, New York, N.Y., a corporation of Delaware Filed Aug. 13, 1965, Ser. No. 479,397
19 Claims. (Cl. 340—172.5)

ABSTRACT OF THE DISCLOSURE

A data processing system having a central processor operable with plural magnetic memory modules and having means for testing any one of the memory modules while the central processor continues to carry out a program in conjunction with the remaining modules. Each memory module includes address registers and an asynchronous logic control unit or command generator which normally operate in response to the central processor but which, during the test mode, operate in response to control signals from manual controls on a test console.

This invention relates to memory testing and maintenance in data processing systems, and more particularly, to a system wherein any one of plural memory modules can be tested while simultaneously executing a normal program using another memory module.

Prior art memory maintenance and test facilities can be roughly divided into two categories. There are those wherein the entire data processing system is shut down either for a scheduled preventive maintenance period or whenever an error is detected in normal operation. Other prior art systems rely on the instructions contained in a test program subroutine in order to activate test logic circuits during either a programmed or an emergency temporary interrupt of the normal program. These test instructions are usually executed by the same central processor unit which controls execution of the regular programming, thereby temporarily halting at least the arithmetic function operations if not the entire system.

The present invention provides improvements over the above described prior art arrangements by providing a system in which the main memory facility is comprised of at least two asynchronous and generally independent memory modules or units which can alternately or even simultaneously be utilized by a single central processor for execution of a normal program. For test purposes, however, any individual memory module can be isolated from the central processor without disrupting normal communication between the central processor and another memory module, so that execution of the normal program can still be performed by the rest of the system as a whole even though one of its component parts is undergoing test. This feature therefore reduces the system down time caused by maintenance and testing. Furthermore, the preferred embodiment of the invention permits execution of memory tests in the selected memory module by means of controls located on a maintenance panel, as contrasted with test routines conducted by means of test instructions processed by the central processor. This means that there need be no costly duplication of central processor control logic merely for test purposes.

It is therefore one object of the present invention to provide a data processing system organization wherein a portion of its memory capacity can be isolated for test purposes without disturbing operations in the remainder of the memory.

Another object of the invention is to provide means for connecting an isolated portion of memory with manual test controls.

A further object of the invention is to provide a system of individual and asynchronous memory modules each adapted during test to automatically generate its own memory cycle timing independently of a common central processor.

These and other objects will be apparent during the following description when read in view of the drawings, in which.

Figure 1:
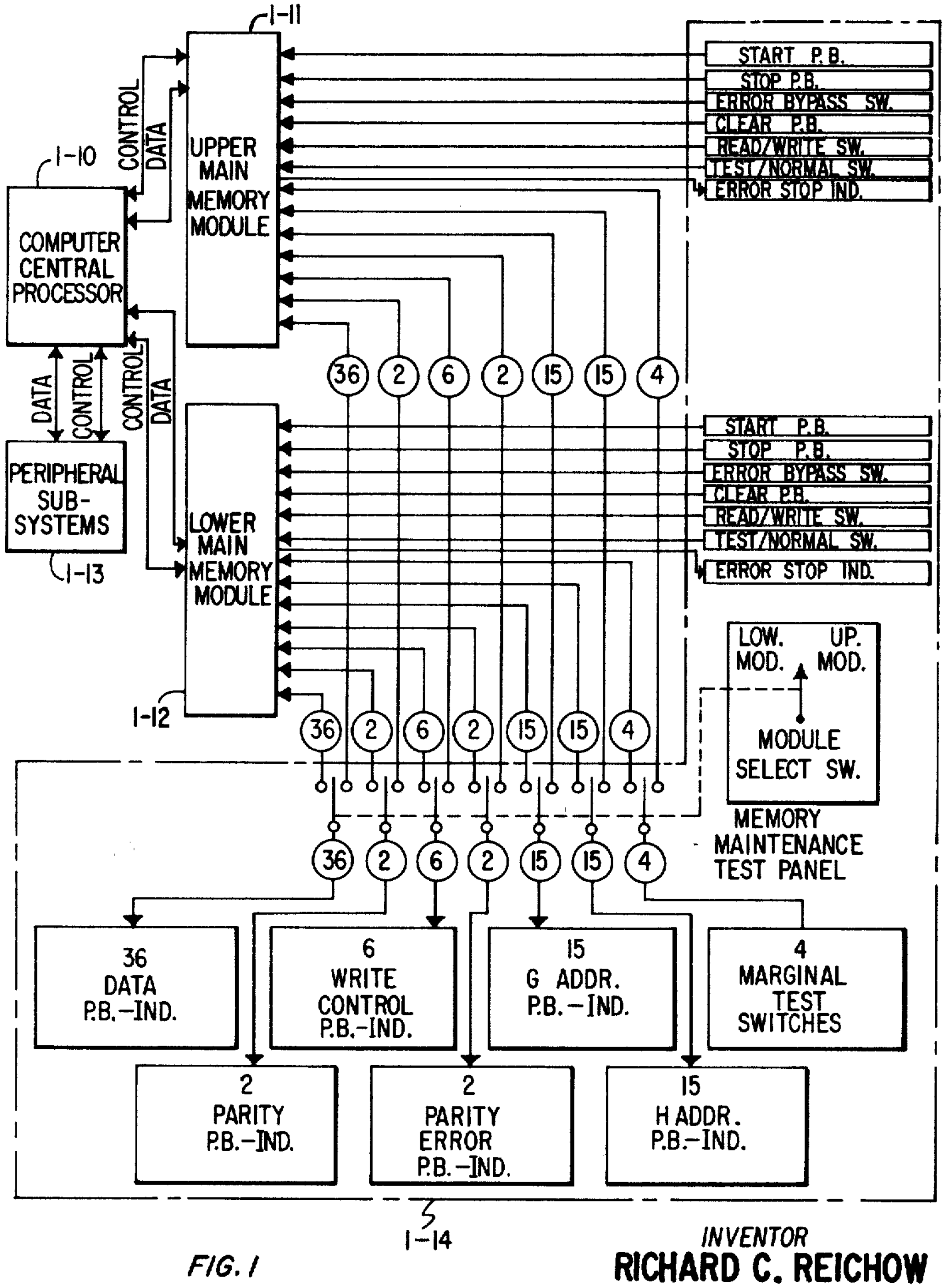
FIGURE 1 is an overall block diagram of a data processing system which incorporates the present invention.

FIGURE 1 is an overall block diagram showing a realized large scale, real time computer or data processing system comprised of a central processor 1–10, respective upper and lower main memory modules 1–11 and 1–12, peripheral subsystems 1–13, and a memory manual test panel 1–14. While its details are not part of the present invention, the central processor 1–10 includes all arithmetic and control logic together with a word control memory and plural input/output channels. It is a parallel, binary digital computer with 36 bit word length. Although basically a single address machine, it has two address capability on many instructions since it can address both main memory and arithmetic accumulators in the same instruction word. The central processor repertoire includes over 150 instructions for operation such as arithmetic (fixed and floating; single and double precision), data transfer, logical, compare and test, shift, input/output, and many others. Its internal word control memory with 128 addressable registers provides extremely high speed storage for index registers, accumulators, I/O access control words, special registers, and general scratch pad use.

The peripheral subsystems 1–13, not part of the present invention, include a synchronizer-control unit and from 1 to 16 peripheral devices. In general, its interface with central processor 1–10 takes the form of two 36 bit parallel data paths (one input and one output) and a number of control lines. Peripheral devices can include magnetic tape units, magnetic drums, printers, punched card equipment, and on-line processors.

The main memory of the system is organized into at least two memory modules or banks 1–11 and 1–12, each of which can be accessed independently by the central processor. When referenced by the processor such that instructions are held in one module and data operands in the other, overlapped memory references reduce the effective memory cycle time by half. Furthermore, the provision of plural, independently accessed memory modules also reduces down time for testing and maintenance since if errors are occurring in one module, the program or data in this module can be transferred therefrom to the other module in order that the erring module can be isolated from central processor control and troubleshot while execution of the program continues in the other module. It is broadly this feature of separating the memory into plural independent portions or units for off-line testing of any one without disturbing normal computer operations in the others which is considered to be a basic feature of novelty in the present invention. The organization of each memory module will be more fully described in connection with the remaining figures.

A second basic feature of novelty lies in the execution of tests on the isolated memory module by means of controls located on maintenance test panel 1–14 in FIGURE 1, as contrasted with the prior art technique of using test instructions carried in the computer program. Both indicator pushbuttons and selector switches are located on the panel, being so connected to the memory module elements that an address can be selected, data written into the selected address, and the memory test initiated and carried to completion. A panel switch serves as a means for isolating the memory module in which testing is to be done. "Isolation" as here used means that the central processor 1–10 cannot utilize the tested module for storage or retrieval of program information, nor can the central processor interfere with a test operation being run in the isolated module. This insures that data entered into a memory module for test purposes will not be altered or cleared from its addressed locations during the test.

In particular, panel 1–14 includes the following controls whose functions will be best appreciated during discussion of the remaining figures. For each memory module, a set of controls individual thereto is provided which comprises Start, Stop and Clear pushbuttons, and Error Bypass, Read/Write, and Test/Normal switches. An Error/Stop indicator light is also provided for each module. Other sets of controls, which are all as a group selectively connected either with the upper memory module 1–11 or the lower memory module 1–12 by means of a Module Select Switch, are: 36 Data pushbutton-indicators (P.B.–Ind.), 2 Parity P.B.–Ind., 6 Write Control P.B.–Ind., 2 Parity Error P.B.–Ind., 15 G Address P.B.–Ind., 15 H Address P.B.–Ind., and 4 Marginal Test switches. For the sake of drawing simplicity, the actual number of channels between each set of controls and each memory module is shown only by the encircled figure, e.g., 36 channels, one for each of the 36 Data pushbutton-indicators.

Figure 2:
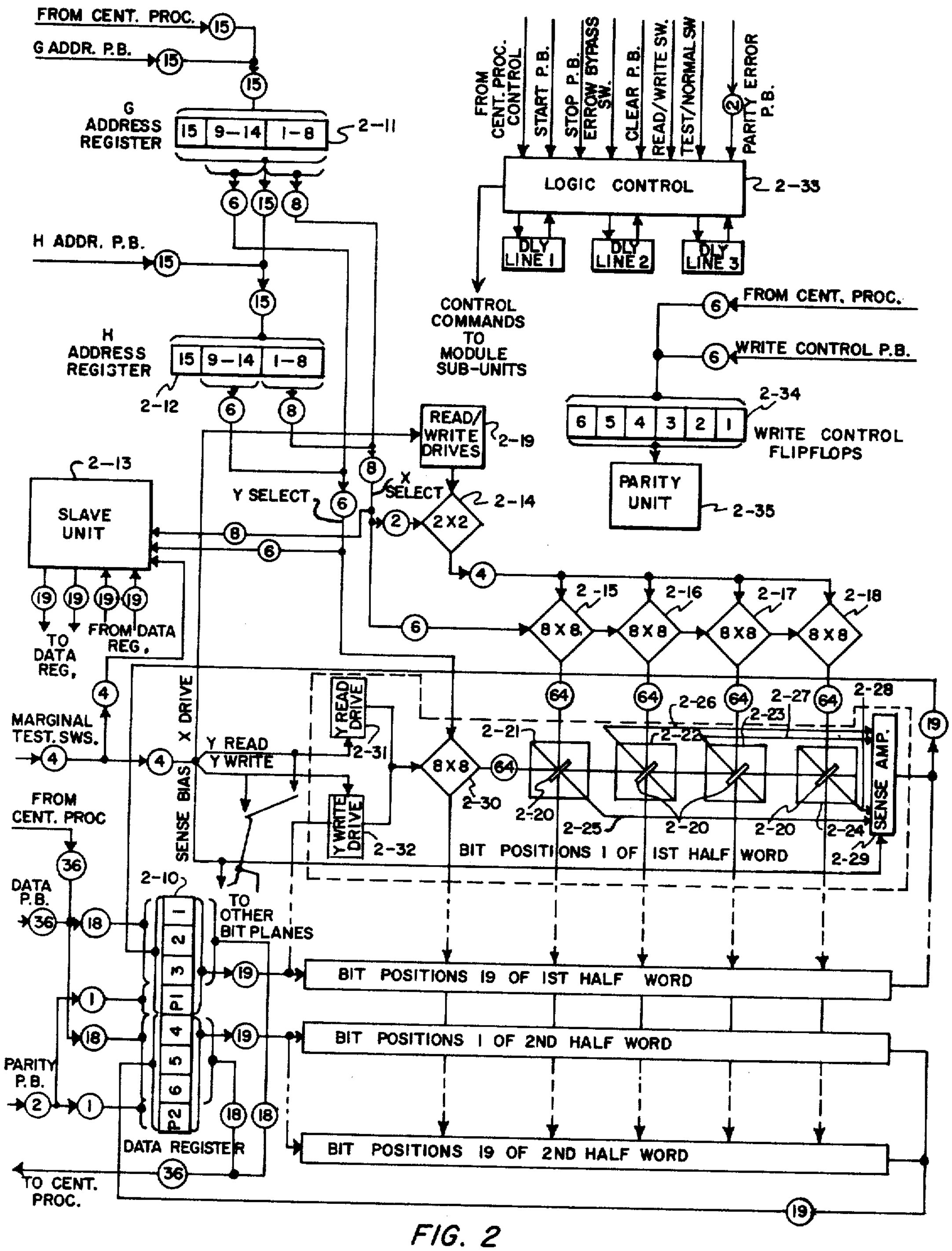
FIGURE 2 is a simplified block diagram showing the general organization of each memory module.

FIGURE 2 shows a simplified version of the subsystem organization of each FIGURE 1 memory module 1–11 and 1–12, but does not disclose all of the various transfer gates and the like which are actually present. In the particular computer embodiment in which the present invention is actually employed, each module is an asynchronous, random access destructive read-out magnetic core memory with a basic modularity capacity of 16,384 words each 38-bits long including 2 parity bits. The module memory cycle time is approximately 750 nanoseconds, and parallel organization is used throughout to maximize the access rate. Each memory cycle includes a Read time, followed by a Write time in the well-known fashion so as to either restore the data previously read out (read/restore mode) or to write in new data (clear/write mode).

In particular, FIGURE 2 discloses a Data Register 2–10 for temporarily holding an information word on its way to or from core storage and which comprises 36 data bit storage stages (each a flip-flop) divided into six groups or bytes of 6 bits each which are numbered as groups 1, 2, 3, 4, 5, and 6. Each 36-bit information word read from or written into a memory location is therefore considered organized into two half words of 18 bits each, with each half word in turn being comprised of three 6-bit groups. Thus, group stages 1, 2 and 3 of the Data Register hold one half word, while groups 4, 5, and 6 hold the other half word. A parity bit (odd parity) can be calculated, stored, and read for each half word, with single bit stages P1 and P2 in the Data Register being provided therefor as temporary buffer storage. Entry of bits into the Data Register for eventual storage in the core stack is made from one of two sources. For normal operation when the central processor is using the memory module, an entire 36-bit word or groups thereof can be transferred in parallel from the central processor into the Data Register via 36 information bit channels. For test purposes, each flip-flop stage in the Data Register can be set to a bit value (usually 1) by momentarily depressing a selected Data pushbutton on the maintenance panel. If the flip-flop stage correctly responds and remains set to value 1, an indicator light within or next to the pushbutton remains lit. The parity P1 and P2 stages in the Data Register can also be set to predetermined bit values (usually 1) by momentary operation of the panel Parity pushbutton-indicator controls.

Each memory module further contains two address registers. The G Address Register 2–11 receives a 15-bit address word for holding same in 15 flip-flop stages during the Read time of a memory cycle in order to specify the particular word location being accessed. This 15-bit address is then transferred to the H Address Register 2–12 comprised of 15 flip-flop stages where it is used to access memory at the same said specified location during the Write time of the same memory cycle. The address word is originally entered into the G Address Register from either the central processor during normal operation, or from the maintenance panel G Address pushbuttons for test purposes. As is the case for the Data pushbuttons, each G Address pushbutton has associated therewith an indicator which lights if the selected G Address Register stage correctly assumes and maintains the bit value state (usually 1) into which it should be placed by momentary depression of the pushbutton. Furthermore, each of the 15 H Address push-button-indicators can be momentarily depressed to set an associated stage of the H Address Register in order to test same for correct operation.

Bits 1–8 and 9–14 of the address word are translated to respectively provide the X and Y dimensions of a coincident current selection system in the core stack. The 15th address bit is used to select the drive for an additional Slave unit 2–13 if present and about which more will be said at a later time. The X selection system is comprised of a 2 by 2 translator unit 2–14 one of whose 4 outputs is selected by two of the eight X address select bits, and four 8 by 8 translator units 2–15 through 2–18 each having 64 outputs one of which is selected by the other six X select bits. Consequently, only one of 256 X drive current paths is completed from an X Read/Write Drive unit 2–19 to a three-dimensional stack of magnetic cores 2–20. As is well known in the art, such a stack generally consists of plural planes or arrays of cores, the number of planes being equal to the number of bits in an information word (in this case 36+2 parity bits). Each plane or array in turn is divided into four sets 2–21 through 2–24 of 64×64 (or 4096) cores each in order to provide a basic modular storage capacity of 16,384 words. Each set in turn is linked in the X direction by the 64 outputs of one of the X translators 2–15 through 2–18, and further has all 4096 cores thereof linked by one of four sense windings 2–25 through 2–28 which in turn are all connected (via pre-amphs if desired) to the output Sense amplifier 2–29 for that plane or bit position.

The Y selection differs from that of conventional 4-wire coincident current systems in that the normally present Inhibit or Z winding is omitted and its function performed by the Y dimension wire. This resulting 3-wire scheme (X, Y, and Sense windings only) therefore requires a separate Y dimension selection for each bit plane or array in the core stack. Thus, the six bit Y select portion of the address word is applied to a separate 8×8 translator 2–30 in each plane to select one of 64 Y drive current paths between the Y read drive 2–31 or Y write drive 2–32 of that plane and the cores of the plane.

Both the X and Y selection systems are bipolar in that coincident current flow is in one direction for read and the opposite direction for write. During read time of a memory cycle both the X read driver and all Y read drivers are operated which results in the coincidentally selected core in each plane or array being read out by clearing same to a 0 value state. During write time the X write driver is operated and each of the Y write drivers are operated or not operated as controlled by the bits in the Data Register. If a Y driver is operated by virtue of a 1 data bit, then a 1 is written into the coincidentally selected core.

Four marginal test switches are located on the maintenance panel which are employed for varying circuit voltages in the X and Y selection systems and the Sense amplifiers. These are labelled as X Drive going to the X Read/Write Drive unit 2–19, Y Read and Y Write respectively going to all of the Y Read Drive units 2–31 and all of the Y Write Drive units 2–32, and Sense Bias going to all of the Sense amplifiers 2–29.

Figure 4:
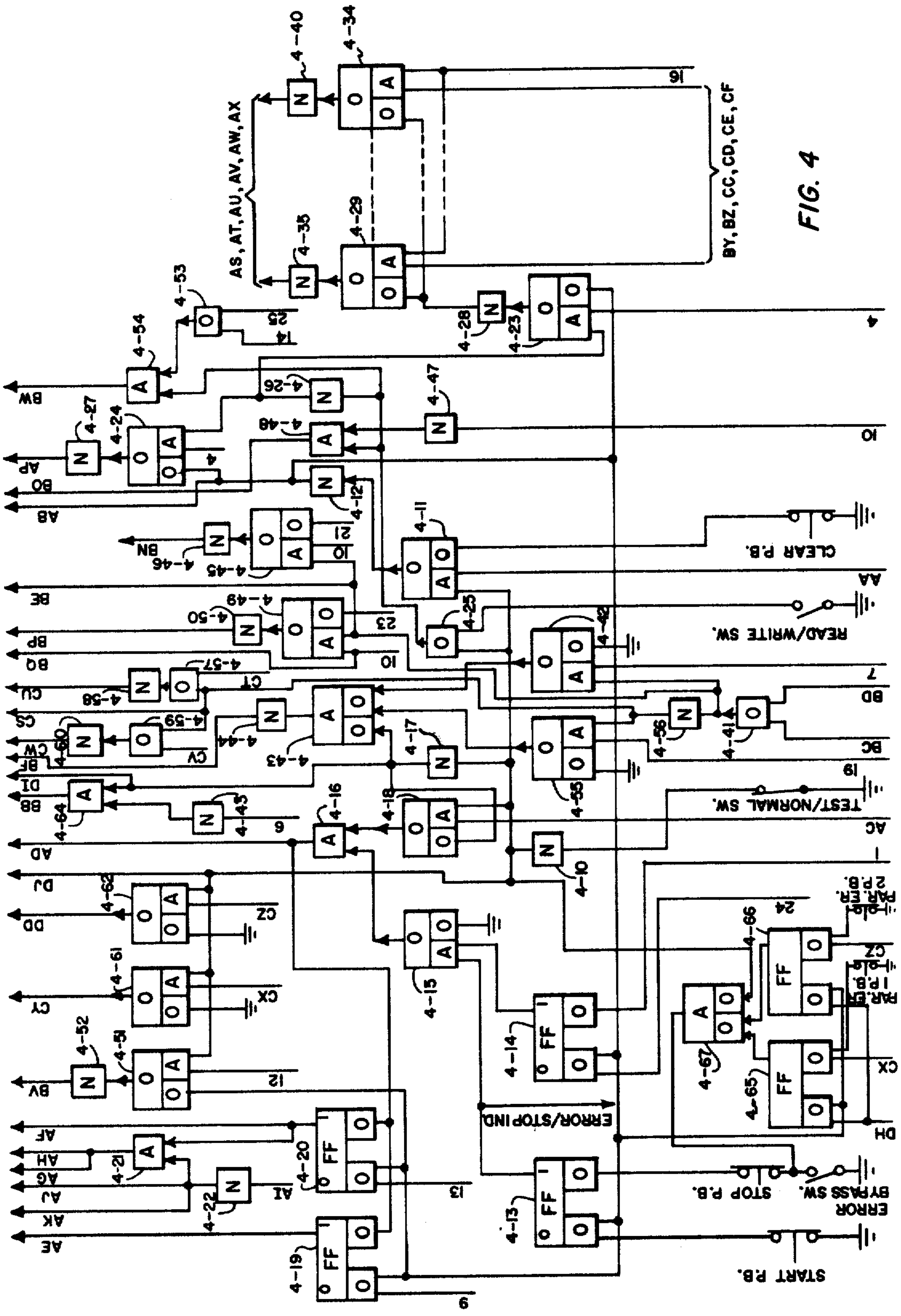
FIGURES 4 and 5 show details of the memory logical control circuits wherein certain manual test controls are incorporated.
Figure 5:
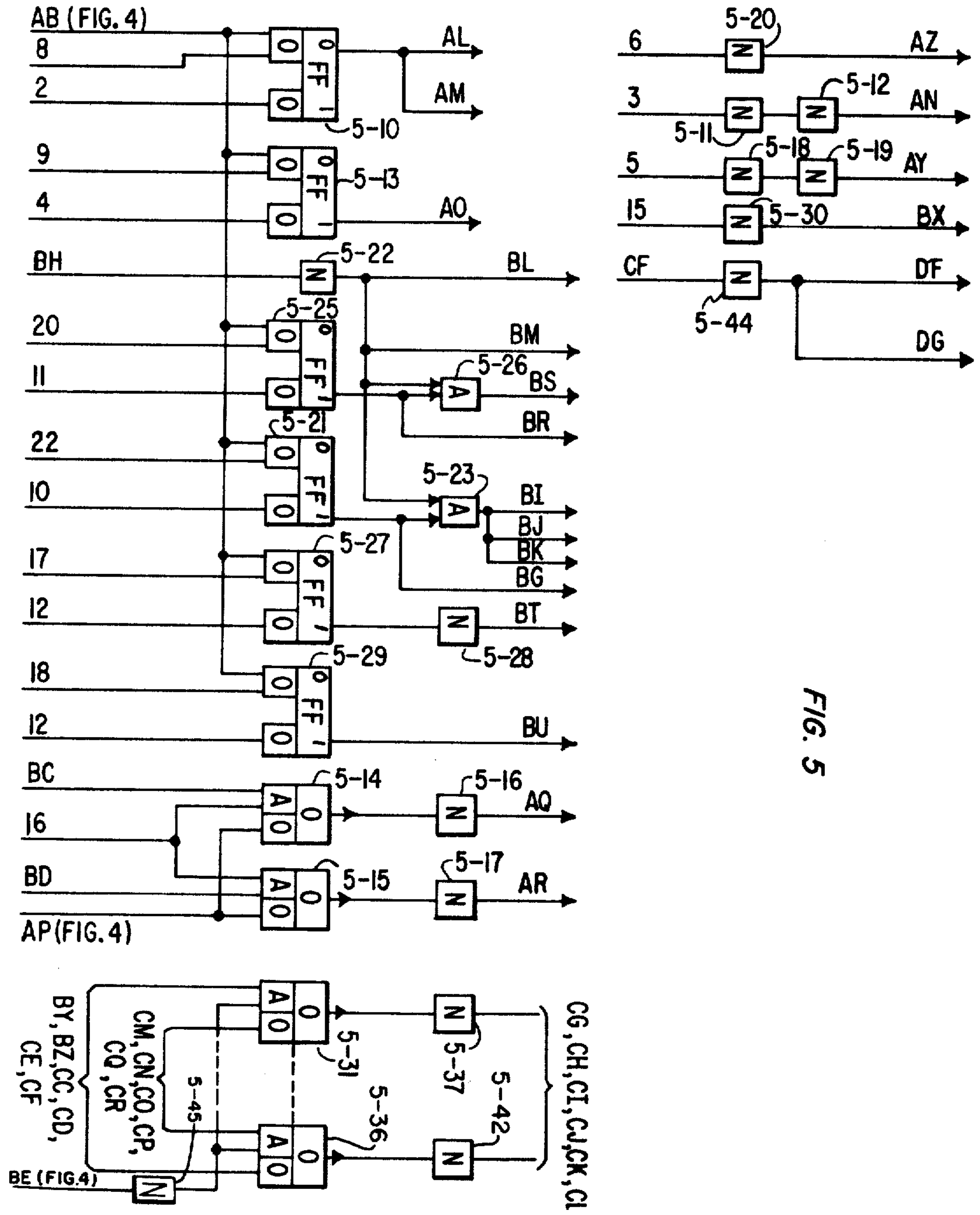

The memory modules further includes a Logic Control unit 2–33 which, in cooperation with a timing chain comprised of Delay Line 1, Delay Line 2, and Delay Line 3, generates various commands during a memory cycle for controlling the transfer of information between module subunits and for controlling the operation of these subunits. For normal operational control of a memory module by the central processor, Logic Control unit 2–33 receives control signals therefrom in order to initiate and direct the command generation functions. For test purposes, however, Logic Control is under the influence of the maintenance panel by means of the Start, Stop, Parity Error and Clear pushbuttons, and the Error By-pass, Read/Write, and Test/Normal switches individual thereto. Details of the Logic Control unit are shown in FIGURES 4 and 5 to be described.

The memory module of FIGURE 2 has further 6 Write Control flip-flops 2–34, one of each 6-bit data word group, each of which when set to a particular state specifies that a new parity bit P1 or P2 must be computed and stored for the half-word in which the corresponding data bit group is found. A Parity unit 2–35 performs this computation, and also contains parity checking circuits. The Write Control flip-flops are selectively set by a Partial Write control word during normal operation from the central processor, or by the Write Control pushbuttons during test.

Besides determining whether a new partiy bit is to be calculated for a half word, the Write Control flip-flops during normal module operation also govern whether a memory cycle is in the read/restore mode or in the clear/write mode, or is a combination of both. When there is no Write Control flip-flop set for either half word, the cycle, is entirely a read/restore mode during which a 36-bit data word and 2 parity bits are (1) read from the addressed core location and transferred to the Data Register from which the data word is then sent to the central processor; (2) parity is checked; and (3) the same data word and same parity bits are rewritten back into the same core location. No new parity bits are calculated in this case. A second case arises when all six Write Control flip-flops have been set by the Partial Write control word, causing only the clear/write mode of operation during the memory cycle wherein a 36-bit data word and parity are withdrawn (no parity check), and an entirely new 36 data word plus calculated parity is then stored. A third case is when during the same cycle a read/restore mode is performed on one entire half word and a clear/write mode on the other entire half word, as called for by the unset or clear condition of all three Write Control flip-flops for said one half word and the set condition of all three Write Control flip-flops for said other half word. Only a new parity bit for said other half word is calculated during this cycle since this comprises 3 groups of new information, although a parity check is conducted on the one half word taken from core storage. A fourth case occurs when the central processor program calls for a partial write in either or both half words, signified by the setting of only one or two, but not three, Write Control flip-flops of a half word in which only one or two of its groups are to be replaced by new data. For this fourth case, the basic memory cycle is extended by 300 nanoseconds through use of Delay line 3 in order to (1) extract the original 36-bit word plus parities and provide parity checking; (2) replace the selected old groups in a half word by new groups of data; (3) calculate a new parity bit for the modified half word; and (4) rewrite the entire word plus parities back into storage.

Each memory module further has provision for doubling the core storage capacity through use of a Slave unit 2–13 which is controlled by most of the elements so far discussed in FIGURE 2. For purposes of this discussion, all elements shown in FIGURE 2 except Slave unit 2–13 may be considered as comprising a so-called Master unit. Slave unit 2–13 is organized to provide additional sets of X and Y drivers, selection switching therefor, and two more half word core stacks which provide storage for another 16,384 words. A Master unit-Slave unit combination consequently can hold 32,768 words. Data received from and written into the Slave unit core stacks also involves use of the Master Unit Data Register 2–10. X and Y selection of a Slave unit location is made from bits 1 through 14 of the address word held in the G and H Address Registers of the Master Unit. Logic Control unit 2–33 and the Write Control flip-flops 2–34 also control Slave unit operation as they do for the Master unit components. However, since only one core word location in a memory module can be accessed during any one memory cycle, the value of bit number 15($2^{14}$) in the Address registers actually determines which set of X and Y drivers (in the Master unit or Slave unit) will be finally energized.

Figure 3A:
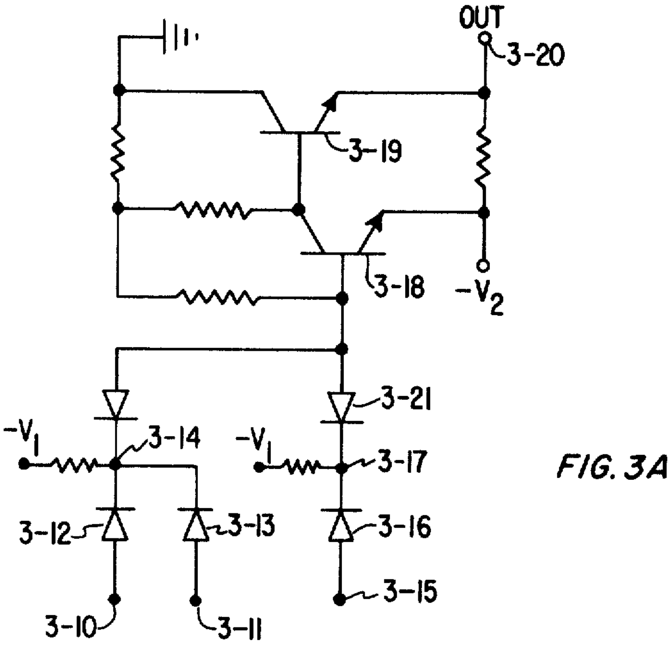
FIGURE 3A to 3H show details and symbols for the various logical components.

FIGURES 3A to 3H show the basic transistor logical gate circuit, and various logical symbols therefor in accordance with its use within the logic diagrams of FIGURES 4 and 5. FIGURE 3A shows an AND-OR-INVERTER configuration having two input terminals 3–10 and 3–11 connected via diodes 3–12 and 3–13 to a first junction 3–14. A third input terminal 3–15 is connected via diode 3–16 to a second junction 3–17. If all three input terminals are grounded or otherwise held at a relatively high potential, then a first transistor 3–18 conducts so as to cut off a second transistor 3–19 in order to drop or make low the potential at output terminal 3–20. If now a relatively low potential is applied to terminal 3–15, or said terminal is left floating, transistor 3–18 ceases to conduct so as to permit conduction in transistor 3–19 which in turn raises the output potential. Similarly, if low potentials concurrently applied to terminals 3–10 and 3–11 (or if they both float), then a high output signal results.

Figures 3B, 3C, 3D, 3E, 3F, 3G, 3H:
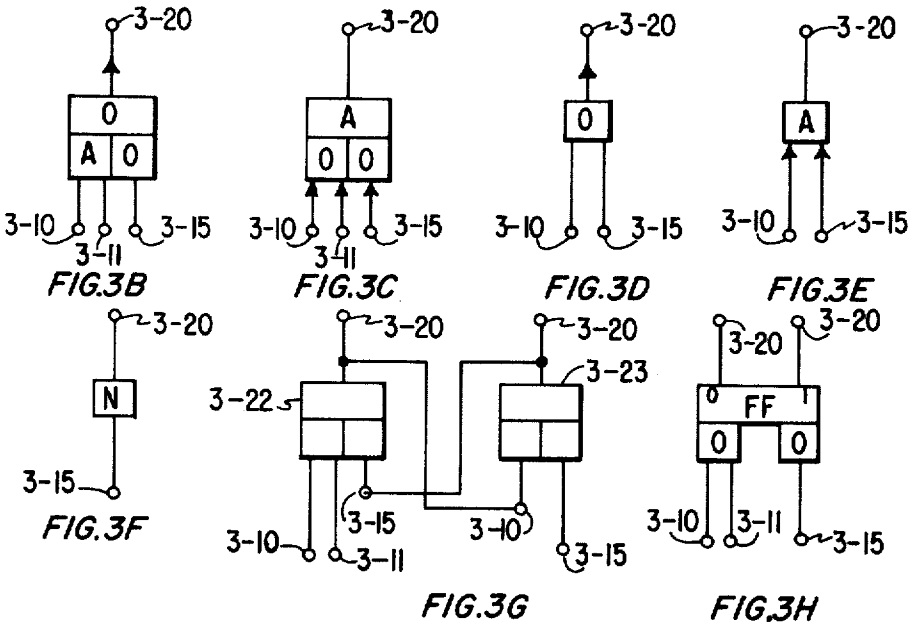

FIGURE 3B is a logic symbol showing one use of the basic gate in generating a high output signal (specified by the arrow) for either or both of two input signal conditions (1) a low signal to input terminal 3–15, or (2) low signals to both input terminals 3–10 and 3–11. FIGURE 3B shows the same gate used to generate a low output signal (absence of arrow) for a high signal at input terminal 3–15 *and* a high signal at either or both of the input terminals 3–10 and 3–11.

If the FIGURE 3A gate is modified by removing input terminals 3–11 and diode 3–13, the resulting structure would provide a high output signal for a low signal to either or both of the remaining two input terminals, as shown in FIGURE 3D. On the other hand, FIGURE 3E shows that said modified gate produces a low output only for high signals concurrently applied to its two inputs. If the gate were further modified by having only one input terminal 3–15, diode 3–16, and diode 3–21 connected to the base of transistor 3–18, then a NOT or inverting function is performed by the gate as shown by FIGURE 3F.

The cross coupling of two FIGURE 3A gates in the manner of FIGURE 3G provides a bistable or flip-flop circuit. Normally, the two inputs 3–10 and 3–11 of gate 3–22, and input 3–15 of gate 3–23 are grounded or otherwise held at a relatively high potential. If a low signal is temporarily applied to any said input terminal, as for example 3–15 of gate 3–23, the output 3–20 of gate 3–23 goes high to make low the output of gate 3–22. This low 3–22 output is cross coupled back to an input of gate 3–23 to keep high said gate output even after the signal at input 3–15 returns to its high value. Similarly, a temporary low signal to either input terminal 3–10 or 3–11 causes a high output from gate 3–22 and a low output from gate 3–23. In order to conserve drawing space, the FIGURE 3H symbol has been adopted for designating the flip-flop circuit of FIGURE 3G.

FIGURES 4 and 5 show details of Logic Control unit 2–33 in FIGURE 2. In order to conserve drawing space, each command signal to and from the unit has been identified in the figures by two letters which are keyed with the command name and function as shown below in Table 1.

TABLE 1

| | | |
|---|---|---|
| AA | Computer Master Clear | Clears all memory flip-flops from pushbutton on central processor. |
| AB | Master Clear | Clears all memory flip-flops from pushbutton on maintenance panel. |
| AC | Memory Request | Starts memory cycle from central processor. |
| AD | Start Delay Line 1 | Initiates operation for Read time of cycle. |
| AE | Y Read #1 | Timing for Y read bit drivers. |
| AF | G Control | Enables all read drivers and read selection switches. |
| AG | G Control & Stack Select #1 | Read enable for Stack #1 (first half word). |
| AH | G Control & Stack Select #2 | Read enable for Stack #2 (second half word). |
| AI | Read Address $2^{14}$ | Determines either master or slave address for read. |
| AJ | Read Master Select | $2^{14}$ bit. |
| AK | Read Slave Select | $\overline{2^{14}}$ bit. |
| AL | Y Read 2-Master | Y bit (read) driver diverter timing for master. |
| AM | Y Read 2-Slave | Y bit (read) driver diverter timing for slave. |
| AN | Clear H | Clears H register. |
| AO | X Read | X read timing. |
| AP | Clear Partial Write | Clears Write Control flip-flops. |
| AQ | Clear Parity 2 | Clears P2 stage. |
| AR | Clear Parity 1 | Clears P1 stage. |
| AS | Clear MDR Group 1 | Clears Data Register stages 1 to 6. |
| AT | Clear MDR Group 2 | Clears Data Register stages 7 to 12. |
| AU | Clear MDR Group 3 | Clears Data Register stages 13 to 18. |
| AV | Clear MDR Group 4 | Clears Data Register stages 19 to 24. |
| AW | Clear MDR Group 5 | Clears Data Register stages 25 to 30. |
| AX | Clear MDR Group 6 | Clears Data Register stages 31 to 36. |
| AY | Transfer G to H | Transfers memory address from G to H register. |
| AZ | Acknowledge | Signals central processor that memory is cycling. |
| BB | Gate Partial Write Command | Gates write control lines to set Write Control flip-flops. |
| BC | Delay Select 1 | Enable for starting delay line 2. |
| BD | Delay Select 2 | Do. |
| BE | Delay Select | Determines extended cycle mode. |
| BF | Gate Data In | Gets data from central processor to data register. |
| BG | H Control | Enables all write switches, drivers, etc. |
| BH | Write Address $2^{14}$ | Determines either master or slave addresses for write. |
| BI | H Control Master | |
| BJ | H Control and Stack Select #1. | Write enable for stack #1 (first half word). |
| BK | H Control and Stack Select #2. | Write enable for Stack #2 (second half word). |
| BL | Write Master Select | $2^{14}$ bit. |
| BM | Write Slave Select | $\overline{2^{14}}$ bit. |
| BN | Parity Timing | Timing pulse to set parity if required. |
| BO | Strobe Timing | Samples core output in Sense amplifier. |
| BP | Start Delay Line 2 | Initiates operation for Write time of cycle. |
| BQ | Start Delay Line 3 | Initiates operation for extended cycle. |
| BR | Y Write #1-Slave | Y bit driver (write) timing for slave. |
| BS | Y Write | Y write timing. |
| BT | Y Write #2 | Y bit driver timing (diverter timing). |
| BU | X Write | X write timing. |
| BV | Clear G | Clears G Address register. |
| BW | Parity Probe | Probes for parity error. |
| BX | Resume | Signifies parity error probe is completed. |
| BY | MDR Clear Group 1 | Write Control, flip-flop set for Group 1. |
| BZ | MDR Clear Group 2 | Write Control flip-flop set for Group 2. |

TABLE 1.—Continued

| | | |
|---|---|---|
| CC | MDR Clear Group 3 | Write Control flip-flop set for Group 3. |
| CD | MDR Clear Group 4 | Write Control flip-flop set for Group 4. |
| CE | MDR Clear Group 5 | Write Control flip-flop set for Group 5. |
| CF | MDR Clear Group 6 | Write Control flip-flop set for Group 6. |
| CG | Gate Sense Group 1 | Gates Sense amplifiers into Data Register stages 1 to 6. |
| CH | Gate Sense Group 2 | Gates Sense amplifiers into Data Register stages 7 to 12. |
| CI | Gate Sense Group 3 | Gates Sense amplifiers into Data Register stages 13 to 18. |
| CJ | Gate Sense Group 4 | Gates Sense amplifiers into Data Register stages 19 to 24. |
| CK | Gate Sense Group 5 | Gates Sense amplifiers into Data Register stages 25 to 30. |
| CL | Gate Sense Group 6 | Gates Sense amplifiers into Data Register stages 31 to 36. |
| CM | Group 1 Gate Sense | Write Control flip-flop clear for Group 1. |
| CN | Group 2 Gate Sense | Write Control flip-flop clear for Group 2. |
| CO | Group 3 Gate Sense | Write Control flip-flop clear for Group 3. |
| CP | Group 4 Gate Sense | Write Control flip-flop clear for Group 4. |
| CQ | Group 5 Gate Sense | Write Control flip-flop clear for Group 5. |
| CR | Group 6 Gate Sense | Write Control flip-flop clear for Group 6. |
| CS | Select Delay Line 3 | Enables delay line 3 operation for extended cycle mode. |
| CT | Not Gate Parity Sense 1 | From first half word Write Control flip-flops. |
| CU | Gate Parity Sense 1 | Gates parity bit sense output into P1 stage. |
| CV | Gate Parity Sense 2 | From second half word Write Control flip-flops. |
| CW | Parity 2 Sense Gate | Gates parity bit sense output into P2 stage. |
| CX | Parity Error 1 | Indicates a parity 1 error. |
| CY | Parity Error #1-Out | Parity error 1 output to central processor. |
| CZ | Parity Error 2 | Indicates a parity 2 error. |
| DD | Parity Error #2-Out | Parity error 2 output to central processor. |
| DE | Not Write Address $2^{14}$ | $\overline{2^{14}}$ of H Address Register. |
| DF | Write Master Select | $2^{14}$ and H Control enable. |
| DG | Not Write Slave Select | Inverse of DF. |
| DH | Fault Reset | Clears parity error storage flip-flops from pushbutton on central processor. |
| DI | Memory Not Available | Indicates when memory is being operated "off-line." |
| DJ | Memory Available | Indicates when memory is being operated "on-line." |

As has previously been mentioned in connection with FIGURE 2, a memory cycle timing chain is comprised of Delay Lines 1, 2, and 3 each of which, when supplied with a low initiate pulse labelled Start Delay Line or Select Delay Line produces sequential timing pulses used to cycle the module through its various functions. This provision of independent timing means in each memory module makes possible the continuous automatic recycling of a memory during test operations independent of central processor operation, in a fashion later to be described. These delay line timing pulses are numbered in FIGURES 4 and 5 generally according to their sequence of generation expressed in nanoseconds, as shown below in Table 2.

TABLE 2

| | Timing Pulses | Time (n. sec.) | | |
|---|---|---|---|---|
| Delay Line 1 | 1 | 30 | | |
| | 2 | 50 | | |
| | 3 | 75 | | |
| | 4 | 100 | | |
| | 5 | 200 | | |
| | 6 | 225 | | |
| | 7 | 275 | | |
| | 8 | 300 | | |
| | 9 | 325 | | |
| | 10 | 375 | | |
| Delay Line 2 | 11 | 375 | 675 | Extended Cycle Operation |
| | 12 | 400 | 700 | |
| | 13 | 450 | 750 | |
| | 14 | 500 | 800 | |
| | 15 | 525 | 825 | |
| | 17 | 575 | 875 | |
| | 18 | 600 | 900 | |
| | 20 | 625 | 925 | |
| | 22 | 700 | 1,000 | |
| | 24 | 740 | 1,040 | |
| Delay Line 3 | 16 | 575 | | No output during cycle operation. |
| | 19 | 600 | | |
| | 21 | [illegible] | | |
| | 23 | 700 | | |
| | 25 | [illegible] | | |

For normal operation by the central processor of a memory module, the panel Test/Normal switch for that module is in a closed position, thereby connecting ground (or a high signal) to the input of N gate 4–10 in order to make low its output. This low output is applied to the *in* A gate of unit 4–11 so that whenever a low Computer Master Clear signal "AA" is received, the *out* O gate of unit 4–11 goes high. N gate 4–12 inverts said last named signal to generate the low Master Clear command "AB" which places the logic in readiness for any subsequent memory request from the computer. In particular, this command "AB" is applied to the left *in* O gates of FF4–13 and 4–14 to clear each of its O state, thereby making low their 1 outputs. The *in* A gate of unit 4–15 responds to these two low signals from FF4–13 and FF4–14 in order to cause the *out* O gate in unit 4–15 to generate a high signal which in turn is applied to A gate 4–16. However, A gate 4–16 cannot produce a low output until its other input also becomes high, as is explained below.

The low output from N4–10 is also inverted by N4–17 to keep high the signal at the *in* O gate of unit 4–18. However, the N4–10 output is directly applied to the *in* A gate of unit 4–18 such that when a low Memory Request command "AC" is received from the computer, the *out* O gate of unit 4–18 goes high. The low Start Delay Line 1 command "AD" is now produced from A4–16 to initiate the memory cycle. "AD" also sets FF4–19 and FF4–20 into their 1 states via their right *in* O gates. A high Y Read #1 command "AE" is now generated from the 1 output of FF4–19, as is a high G Control command "AF" from FF4–20. "AF" also is applied to A gate 4–21 whose output goes low (when the other input to A gate 4–21 is high) in order to generate the "AG" and "AH" commands G Control & Stack Select #1 and G Control & Stack Select #2. The said other input to A4–21 becomes high when the input "AI" (Read Address $2^{14}$) is low to N4–22. Other outputs from N4–22 also become the Read Master Select Command "AJ" and the Read Slave Select command "AK."

The first timing pulse 1 (from Delay Line 1) is subsequently applied via the right *in* O gate to set FF4–14 into its 1 state, making high its 1 output terminal to thereby terminate command "AD" which is no longer necessary. While FF4–14 is so set to 1, any subsequent Memory Request commands "AC" will be ignored by the memory module logic.

Timing pulse (TP)2 next arrives to set FF5–10 in order to generate low "AL" and "AM" commands Y Read 2-Master and Y Read 2-Slave, respectively. TP3, when later applied to N5–11 and N5–12, becomes the low Clear H command "AN." The appearance of TP4 initiates a variety of functions, such as the setting of FF5–13 to generate the "AO" high command X Read. TP4 further is applied to the *in* A gates of units 4–23 and 4–24. Since the N4–10 output is always low during a normal operation, the output of O4–25 is therefore continually high which, when inverted via N4–26, maintains a low signal to the other inputs of said *in* A gates in units 4–23 and 4–24. Thus, said TP4 causes the *out* O gate of unit 4–24 to generate via N4–27 the low "AP" command Clear Partial Write. "AP" is in turn also applied to the *in* O gates of units 5–14 and 5–15 in order to respectively generate, via N5–16 and N5–17, the low "AQ" and "AR" commands Clear Parity 2 and Clear Parity 1. In unit 4–23, the resulting high signal during TP4 from the *out* O gate is inverted via N4–27 for application to the *in* O gates of six units 4–29 through 4–34 (only two of which are shown for the sake of drawing simplicity). Consequently, the *out* O gates in these six units respectively generate, via N gates 4–35 through 4–40, the six low commands Clear MDR Group 1, Clear MDR Group 2, . . . Clear MDR Group 6 which are conveniently labelled in FIG. 4 as "AS," "AT," "AU," "AV," "AW," and "AX."

Further detailed description of normal, on-line memory operation will not be given since it is believed that the above remarks give ample guidance as to the general functioning of the particular system in which the present invention finds particular, but not exclusive, use. Brief mention will only be made of the extended cycle mode wherein Delay Line 3 is enabled prior to Delay Line 2. This occurs whenever comparison circuits (not shown) determine that one or two Write Control flip-flops for either half word have been set, thus bringing down either or both of the commands "BC" and "BD." If this is the case, then the resulting high output from O4–41 prevents TP10 from generating the Start Delay Line 2 command "BP" via unit 4–49. Instead the now low output from N4–56 (labelled "CS") switches with the "BQ" command at an AND gate (not shown) to start Delay Line 3 and thus add 300 nanoseconds to the memory cycle. A timing pulse 23 from Delay Line 3 later passes through unit 4–49 to finally start Delay Line 2. TP24 in turn clears FF4–14 so that the output of unit 4–15 once again goes high to gate through, via unit 4–18 and A4–16, a later applied Memory Request command "AX" from the central processor.

OFF-LINE TEST OPERATION

Whenever one of two or more memory modules shows signs of malfunctioning, the present invention permits off-line testing of same without shutting down normal communication between the central processor and the other memory module. The memory module under test can be operated off-line from the test panel in either the clear-write or read-restore modes, with respective checking of the parity compute and error circuits. Marginal voltage tests can also be conducted during either mode. Because of the asynchronous timing means in each module, successively repeated test cycles can be automatically performed.

The following steps should be taken to accomplish the above.

(1) Place panel Module Select Switch in either its Lower Module or Upper Module position in accordance with the module under test. This connects the panel Marginal Test switches and Data, Parity, Write Control, Parity Error, G Address and H Address pushbuttons to the selected module.

(2) Place test module panel Test/Normal switch in its test position. This disconnects from ground the input to N4–10, thus making high its output which in turn makes low the output of N4–17 in order to keep high the output of unit 4–18 for the entire test operation. The presence or absence of a Memory Request command "AC" thus has no effect upon module operation, even though there has been no physical disconnection of the AC lead from the central processor. Furthermore, the now high output of N4–10 (a) prevents any computer Master Clear command "AA" from passing through unit 4–11 and inadvertently clearing the module during test; (b) prevents clearing of the G Address Register via unit 4–51 so that the address entered therein from the panel cannot be erased; and (c) prevents indication of parity error from units 4–61 and 4–62, but rather permits unit 4–67 to pass any parity error indication which has set either FF4–65 or FF4–66. The now low output from N4–17 also (a) disables generation of the "BB" command Gate Partial Write Command from A4–64 so as to prevent unwanted Write Control flip-flops from being set; and (b) disables unit 4–43 from placing data into the Data register which, if allowed to occur, might set unwanted bits therein during test. All of the above described effects, resulting from the Test/Normal switch position, go to insuring the accuracy of the test routines.

(3) Depress panel Clear pushbutton for the memory module under test. This temporarily floats the input to the *in* O gate of unit 4–11 so as to manually generate the Master Clear command "AB" which resets all flip-flops to an O state.

(4) Depress appropriate panel Stop pushbutton which momentarily floats the input to the right *in* O gate of FF4–13 to set same into its 1 state. This makes its 1 output terminal in order to make low the output of unit 4–15.

(5) Place module Read/Write switch in the Write position which closes the contacts in FIG. 4 to connect one input of O4–25 to ground (or to a high signal). Since the output of N4–10 is high whenever testing, the output of O4–25 is governed by the position of the module Read/Write Switch. When closed for Write, O4–25 goes low to (a) disable Strobe Timing command "BO" generation from A4–48; (b) prevent unit 4–23 from producing an output at TP4 time which in turn inhibits generation of the Clear MDR group commands "AS," "AT," etc.; and (c) prevent unit 4–24 from clearing the Write Control flip-flops at TP4. Functions (a) and (b) above therefore prevent the changing of any information placed manually into the Data Register while function (c) insures that any bits manually put into the Write Control flip-flops will not be erased. Another purpose of the Write position of the Read/Write switch is to inhibit A4–54 from generating the Parity Probe command "BW," since this command should be disabled during the test Clear/Write mode in order to prevent any possible stopping of the test operation due to parity error detection at this time.

(6) Set a desired memory location 15-bit address into the G Address Register by depressing selected panel G Address pushbuttons. Do not depress any H Address pushbuttons unless, during a separate independent test, it is desired to merely check their bistable characteristics.

(7) Set desired data bits into one or more stage groups of the Data Register by depressing selected panel Data pushbuttons.

(8) If it is desired to check the parity compute circuits for either or both of the half words, set one or more Write Control flip-flops by the manual Write Control pushbuttons. For example, if any 1, 2, or 3 Write Control flip-flop is so set, then the P1 parity bit will be computed for the first half word in Data Register group stages 1, 2, and 3 during Write time of the memory cycle.

(9) If no Write Control flip-flop for a half word has been set during Step 8 above, place a selected (either true or false) parity bit into the associated halfword parity stage P1 or P2 by means of the appropriate manual Parity pushbutton.

(10) Depress panel Start pushbutton for the module under test. This floats the input terminal to the left in O gate of FF4–13 so that said flip-flop is cleared to an O state, making low its 1 output. This in turn makes high the output of O4–15 which, when coupled with the constant high output from unit 4–18 during test, causes A4–16 to generate the low "AD" command Start Delay Line 1 which commences a memory cycle. The selected memory location is now accessed for storage therein of data from the Data Register. Although timing pulse 1 clears FF4–14 in normal fashion to terminate command "AD," timing pulse 24 at the end of the first memory cycle resets it once again to automatically commence a second memory cycle during which the same Clear/Write operation occurs. Until FF4–13 is set to 1, additional memory cycles continue to occur so that the same data in Data Register is repeatedly entered into the addressed memory location. This is a novel feature of the invention, which permits utilization of the module normal one-cycle timing means for repeated test cycles.

(11) Next depress the module panel Stop pushbutton to change the state of FF4–13 so as to stop memory operation by inhibiting generation of the "AD" command Start Delay Line 1.

(12) Place the Read/Write Switch in its Read (open) position. This makes high the output of O4–25 to permit generation of the "BO," "AP," "BW," and "AS," "AT," etc. commands during a memory cycle, so that the word stored in the addressed memory location is transferred to the Data Register, parity is checked, and the data word is stored back into the same memory location. It may thus be observed that the provision of the Read/Write switch permits the operator to selectively determine whether the test cycle will be conducted in the clear/write mode or the read/restore mode, in order to increase the variety of tests possible for the memory module.

(13) Depress module Start pushbutton in order to clear FF4–13. This again permits A4–16 to automatically generate commands "AD" so as to cause recurring memory cycles until the Stop pushbutton is once again operated, or until a parity check error sets either FF4–65 or FF4–66 to make low the output of unit 4–67. The module Error Bypass switch is provided which, when closed, grounds the output of unit 4–67 to prevent setting of FF4–13 even for detected parity error. In order to further test the operation of FF4–65 and FF4–66, the Manual Parity Error 1 and Parity Error 2 pushbutton-indicators are provided to respectively set them to their error indicating states.

(14) The four Marginal Test switches can be moved from Normal to both High and Low positions while the memory is running in the read/restore mode, either for off-line test or on-line control by the central processor.

While the present invention has been described in the context of a particular realized data processing system, it is easily adaptable for use in many other system configurations where the main memory can be divided into plural independently accessible units. In practice, an individual set of marginal test switches would probably be wired into each memory module to be controlled from the panel. Other types of memories can also be tested. Furthermore, fewer or more test features may be provided on the manual test panel as the circumstances require. It is therefore evident that while a preferred embodiment of the invention has been shown and described, modifications thereto and variations thereof may occur to those skilled in the art without departure from the novel principles defined in the appended claims.

The embodiments of the invention in which an exclusive property or privilege is claimed are defined as follows:

1. A data processing system comprising:

(a) a central processor and a plurality of independently accessible memory modules each adapted to be individually controlled by the central processor for the execution of a central processor program;

(b) first means operable to selectively isolate any one of said memory modules from control by said central processor while still permitting said central processor to control any non-isolated memory module for the execution of the central processor program; and (c) second means operable for performing test routines upon any said isolated memory module independently of the central processor program.

2. The invention according to claim 1 wherein said first means includes manually controlled switch circuit means.

3. The invention according to claim 1 wherein said second means includes manually controlled switch circuit means.

4. The invention according to claim 1 wherein said first and said second means both include manually controlled switch circuit means.

5. In a data processing system which includes a central processor, the combination comprising:

(a) a plurality of independently accessible and asynchronous memory modules each adapted to be individually controlled by the central processor for the execution of a central processor program, with each said memory module including cycle timing means responsive to receipt of a central processor command for conducting only one memory cycle operation;

(b) first means operable to block receipt of a said central processor command by the said cycle timing means in any one of said memory modules so as to selectively isolate said one memory module from control by the central processor while still permitting the said cycle timing means in any other memory module to receive a said central processor command for the execution of the central processor program; and (c) second means operable for performing test routines upon any said isolated memory module independently of the central processor program, with said second means including recycle means for causing the said cycle timing means in a said isolated memory module to automatically conduct successive memory cycle operations.

6. The invention according to claim 5 wherein said first means includes manually controlled switch circuit means.

7. The invention according to claim 5 wherein said second means includes manually controlled switch circuit means.

8. The invention according to claim 5 wherein said first means and said second means both include manually controlled switch circuit means.

9. The invention according to claim 8 wherein each said memory module includes at least one memory address register and a data buffer register, and said second means is selectively operable to enter information into said registers of a said isolated memory module.

10. The invention according to claim 8 wherein each said memory module includes parity bit buffer storage means, and said second means is selectively operable to enter information into said parity bit buffer storage means of a said isolated memory module.

11. In a data processing system which includes a central processor, the combination comprising:

(a) a plurality of independently accessible and asynchronous memory modules each adapted to be individually controlled by the central processor for the execution of a central processor program;

(b) separate cycle timing means in each said memory module which, when initiated, sequentially generates timing pulses to conduct only one memory cycle operation;

(c) a separate logic circuit means in each said memory module comprising in combination a first AND means with an output connected to initiate said cycle timing means therein and with inputs from a second AND means and a first OR means, first and second bistable means each with an output connected from its first stable state side to said second AND means, first means to selectively apply a Start signal indication to the first stable state side of said first bistable means or a Stop signal indication to the second stable state side of said first bistable means, second means to respectively apply early and late timing pulses from said cycle timing means to the second and first stable state sides of said second bistable means, a third AND means with an output connected to said first OR means and with one input adapted to receive a Memory Request signal indication from the central processor, and third means to selectively apply a Normal signal indication to a second input of said third AND means or a test signal indication to said first OR means; and (d) testing means for entering information into each said memory module independently of the central processor program.

12. The invention according to claim 11 wherein said first and third means both include manually controlled switch circuit means.

13. The invention according to claim 11 wherein said testing means includes manually controlled switch circuit means.

14. The invention according to claim 13 wherein said first and third means both include manually controlled switch circuit means.

15. The invention according to claim 14 wherein each said memory module further includes a parity checking unit, and each said separate logic circuit means further includes error stop bistable means with an output connected to the second stable state side of said second bistable means and an input connected with the output of said parity checking unit.

16. The invention according to claim 15 wherein said logic circuit means further includes a manual error bypass switch operable to isolate the said second bistable means from the output of said error stop bistable means.

17. In a data processing system which includes a central processor, the combination comprising:

(a) a plurality of independently accessible memory modules each adapted to be individually controlled by the central processor for the execution of a central processor program, each said memory module including at least one storage means as well as circuit means for always clearing said storage means during a normal memory cycle operation which is initiated by the central processor;

(b) first means operable to selectively isolate any one of said memory modules from control by the central processor while still permitting central processor control of any non-isolated memory module for the execution of the central processor program; and (c) second means operable for performing test routines upon any said isolated memory module independently of the central processor program, where said second means includes entry means for selectively placing information into said storage means and inhibit means for preventing the clearing of said storage means by said circuit means.

18. The invention according to claim 17 wherein each said storage means is a memory address register.

19. The invention according to claim 17 wherein each said storage means is a data buffer register.

References Cited

UNITED STATES PATENTS

| | | | |
|---|---|---|---|
| 3,226,684 | 12/1965 | Cox | 340—172.5 |
| 3,303,474 | 2/1967 | Moore et al. | 340—172.5 |

ROBERT C. BAILEY, *Primary Examiner.*

G. D. SHAW, *Assistant Examiner.*